United States Patent
Ma et al.

(10) Patent No.: US 12,026,610 B2
(45) Date of Patent: Jul. 2, 2024

(54) REINFORCEMENT LEARNING BY SHARING INDIVIDUAL DATA WITHIN DYNAMIC GROUPS

(71) Applicant: INTERNATIONAL BUSINESS MACHINES CORPORATION, Armonk, NY (US)

(72) Inventors: Chun Yang Ma, Beijing (CN); Zhi Hu Wang, Beijing (CN); Shiwan Zhao, Beijing (CN); Li Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1231 days.

(21) Appl. No.: 16/141,251

(22) Filed: Sep. 25, 2018

(65) Prior Publication Data
US 2020/0097811 A1 Mar. 26, 2020

(51) Int. Cl.
*G06N 3/08* (2023.01)
*G06N 20/00* (2019.01)
*G05D 1/00* (2006.01)

(52) U.S. Cl.
CPC .............. *G06N 3/08* (2013.01); *G06N 20/00* (2019.01); *G05D 1/0088* (2013.01)

(58) Field of Classification Search
CPC .......... G06N 3/08; G06N 20/00; G06N 20/10; G06N 20/20
USPC .......................................................... 706/25
See application file for complete search history.

(56) References Cited

U.S. PATENT DOCUMENTS

| | | | | |
|---|---|---|---|---|
| 6,397,166 | B1* | 5/2002 | Leung | G06F 17/18 |
| | | | | 702/179 |
| 10,762,785 | B1* | 9/2020 | Dewey | G08G 1/166 |
| 10,885,432 | B1* | 1/2021 | Dulac-Arnold | G06N 3/08 |
| 2005/0027681 | A1* | 2/2005 | Bernstein | G06F 16/258 |
| 2017/0310643 | A1 | 10/2017 | Hardy et al. | |
| 2017/0322534 | A1* | 11/2017 | Sinha | G06F 3/165 |
| 2018/0181108 | A1* | 6/2018 | Nagano | G05B 19/182 |
| 2018/0225587 | A1* | 8/2018 | Khidekel | G06Q 30/0201 |
| 2018/0260707 | A1* | 9/2018 | Schaul | G06N 3/08 |
| 2018/0281180 | A1* | 10/2018 | Yamamoto | B25J 9/1664 |
| 2019/0005812 | A1* | 1/2019 | Matus | G06V 20/584 |
| 2019/0258938 | A1* | 8/2019 | Mnih | G06N 3/045 |
| 2021/0110271 | A1* | 4/2021 | Gendron-Bellemare | |
| | | | | G06N 3/006 |

OTHER PUBLICATIONS

Warren et al., "ENMTools: a toolbox for comparative studies of environmental niche models", 2010 (Year: 2010).*

(Continued)

*Primary Examiner* — Tsu-Chang Lee
(74) *Attorney, Agent, or Firm* — Tutunjian & Bitetto, P.C.; James Olsen (57) ABSTRACT

Methods and systems for reinforcement learning with dynamic agent grouping include gathering information at a first agent using one or more sensors. Shared information is received at the first agent from a second agent. An agent model is trained at the first agent using the gathered information and the shared information. A contribution of the shared information is weighted according to a degree of similarity between the first agent and the second agent. An action is generated using the trained agent model responsive to the gathered information.

20 Claims, 6 Drawing Sheets

(56) References Cited

OTHER PUBLICATIONS

Wang et al., "Learning to Reinforcement Learn", 2017 (Year: 2017).*
Volodymyr Mnih et al., Asynchronous Methods for Deep Reinforcement Learning, Proceedings of the 33 rd International Conference on Machine Learning, New York, NY, USA, Jun. 2016.
Xinagru Lian et al., Asynchronous Decentralized Parallel Stochastic Gradient Descent, Mathematics > Optimization and Control, arXiv:1710.06952, Feb. 2018.
Pijika Watcharapichat et al., Ako: Decentralised Deep Learning with Partial Gradient Exchange, SoCC '16, Santa Clara, CA, Oct. 5-7, 2016.
Yufei Tao et al., Prediction and Indexing of Moving Objects with Unknown Motion Patterns, ACM SIGMOD'04, Paris, France, Jun. 13-18, 2004.
Yusuke Tsuzuku et al., Variance-Based Gradient Compression for Efficient Distributed Deep Learning, Computer Science > Machine Learning, arXiv:1802.06058, Feb. 2018.

* cited by examiner

REINFORCEMENT LEARNING BY SHARING INDIVIDUAL DATA WITHIN DYNAMIC GROUPS

BACKGROUND

Technical Field

The present invention generally relates to information sharing between dynamic groups of agents and, more particularly, to interactive personal assistants that draw information from similarly situated agents to make intelligent decisions and recommendations.

Description of the Related Art

With the advent of machine learning techniques and the ever-growing data resources made available by the Internet of Things and connected mobile devices, a wealth of information can be used to make recommendations to users that are appropriate to their particular contexts. Such systems are referred to herein as interactive personal assistants. Interactive personal assistants are implemented in, for example, users' connected mobile devices, automobiles, and computers to provide an intuitive user interface that can accept natural language requests and provide context-sensitive responses.

SUMMARY

A method for reinforcement learning with shared information includes gathering information at a first agent using one or more sensors. Shared information is received at the first agent from a second agent. An agent model is trained at the first agent using the gathered information and the shared information. A contribution of the shared information is weighted according to a degree of similarity between the first agent and the second agent. An action is generated using the trained agent model responsive to the gathered information.

A method for dynamically grouping agents includes clustering agents in a parameter space. Each agent is represented as a point in the parameter space. A similarity score is determined for each pair of agents. The clustering and determining steps are iterated for a predetermined number of iterations, determining a respective set of similarity scores at each iteration. The similarity score for each pair of agents is summed across all iterations. Agents that have an above-threshold summed similarity score are grouped together. Information from each agent is shared with those other agents it has been grouped with, along with a respective summed similarity score, to train each agent.

A system for providing personalized recommendations with dynamic agent grouping includes an agent manager configured to collect information from a plurality of individual agents and to share information between similar agents. The agent manager includes a processor device, a network interface, an agent grouping module, and a sharing module. The agent grouping module is configured to cluster the plurality of agents using the processor in a parameter space, with each agent being represented as a point in the parameter space. The agent grouping module determines a similarity score for each pair of agents in the plurality of agents, iterates the clustering and determining for a predetermined number of iterations, determines a respective set of similarity scores at each iteration, sums the similarity score for each pair of agents across all iterations, and groups agents that have an above-threshold summed similarity score. The sharing module share information, using the network interface, from each agent with those other agents that each agent has been grouped with, along with a respective summed similarity score, to train each agent.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention strike a balance between the efficiency of training a single agent to guide all interactions, which lacks the specificity that the present embodiments provide, and training different agents for each individual object, which fails to leverage shared contexts between objects and which often suffers from a lack of sufficient training data. To accomplish this, the present embodiments dynamically group and de-group objects according to changing object statuses and contexts, sharing information between grouped objects to train a shared agent that is used to provide context-sensitive feedback to users.

One specific use case is in interactive personal assistants within automobiles for, e.g., personalized route guidance, personalized climate and powertrain control, and personalized, scenario-based infotainment. Personalized route guidance can learn and predict routes based on contextual information, learn and predict destinations, learn and predict stop-by locations, all based on historical and real-time behavior from a group of different agents along with personal preferences. Climate and powertrain control can learn and recommend cabin climate and comfort control settings based on the occupants' preferences and real-time contexts, such as the weather. Personalized, scenario-based infotainment can learn and recommend infotainment program settings and commerce offerings based on the occupants' preferences and real-time contexts to provide, e.g., music selections.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 1:
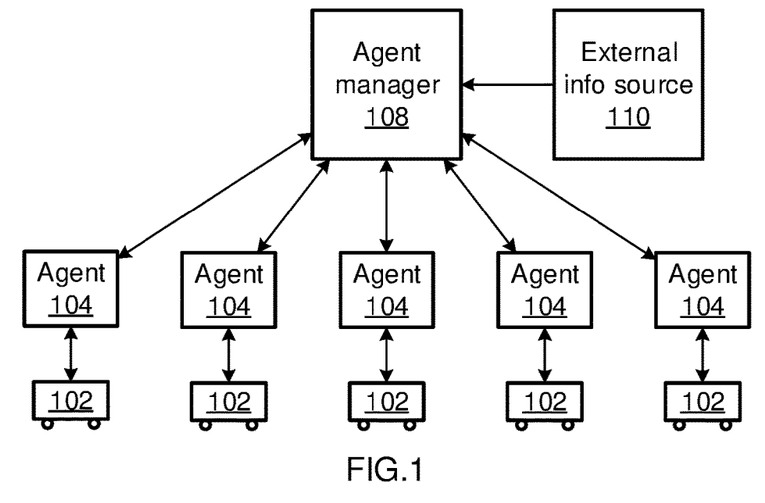
FIG. 1 is a block diagram of a system for delivering personalized recommendations using dynamic agent grouping in accordance with an embodiment of the present invention.

Referring now to FIG. 1, an exemplary interactive personalized assistant system 100 is shown. A number of individual objects 102 each have respective agents 104. The objects 102 are described herein as being automobiles, but it should be understood that they may be implemented instead as connected mobile devices, objects in the Internet of Things, or any other appropriate device having network connectivity. The objects 102 generally include at least sensor, which collects information about the object's context, and some interface with the user, whether through an explicit user interface or through user-perceptible controls such as through, e.g., climate control settings or other functions related to the object 102. In the particular context of sensor data from connected vehicles, sensor data may include, e.g., vehicle settings, occupant information, real-time traffic information, vehicle location, and user feedback. Additional information available is made available to the agents 104 by external information source 110 and may include, for example, traffic information, map information, weather information, events and activities, and infotainment content.

In one specific example, where the agent 104 manages air quality within a vehicle, the agent 104 tracks information relating to the external weather conditions, the external air quality, the external traffic, car usage conditions (e.g., air filter status and car window status), and in-vehicle air quality. The agent 104 can take or recommend actions such as, e.g., opening a car window, closing a car window, setting the air conditioner to recirculate air, and setting the air conditioner to use external air. The agent 104 monitors the results of the action, for example determining whether the in-vehicle air quality has improved according to some metric or by assessing the driver's feedback (e.g., whether the driver takes the recommended action). The results of the action are used in reinforcement learning to reinforce or diminish a particular behavior pathway.

The agent manager 108 identifies similarities between the agents 104 and tracks that similarity over time. The agent manager 108 shares experience information between similar agents 104. Thus, objects 102 that have shared contexts each have a personalized agent that is nonetheless trained on information provided by the similar agents 104. Each agent 104 receives sensor information and other information including, e.g., personal preferences, from its associated object 102 and from similar objects 102. Based on this shared information, each agent refines and reinforces its machine learning model(s). Although the present embodiments are described with shared information passing through the agent manager 108, it is also contemplated that information may be shared between agents directly, for example through wireless internet connectivity.

One machine learning model that may be employed in the present embodiments is reinforcement learning, though it should be understood that other machine learning models may be used instead. In an exemplary reinforcement learning embodiment, each agent 104 updates the weights of a neural network based on received information. This information may either reinforce or diminish agent behaviors by, e.g., a feed-forward, back propagation loop in the neural network. This process may continue until the neural network parameters converge or until a predetermined number of iterations has been performed. A cost function may be used to guide the update of weights in the neural network, with the goal being to find a set of parameters that minimizes the cost function in view of received information.

Following this example, each agent 104 is controlled by a set of n parameters that guide its decision-making, where the n parameters may represent the weights of a neural network. The decision-making process within the agent 104 uses the learned neural network model to determine an output based on sensed inputs. These n-parameters define an n-dimensional space, while the cost function defines a surface in that space. The agent 104 moves on the surface in the n-dimensional parameter space as its neural network is iteratively updated, eventually reaching some local minimum that sets the parameters for the agent's output.

The agent manager 108 thus uses a gradient descent process to identify similar agents 104 and group them together. The agent manager 108 tracks pairs of agents 104 through a set of iterations and measures distances in the n-dimensional space to characterize a degree of similarity at each step. The agent manager 108 creates a cumulative similarity score across the different steps, so that it is not only the agents' endpoints that are considered, but also the closeness of their paths through the space.

The agent manager 108 recalculates the groups for each agent 104 on a dynamic basis. Recalculation can be performed periodically, for example at some predetermined frequency, or it can be performed in accordance with some triggering event. There exists a tradeoff between the frequency at which groups are recalculated and the cost of performing the calculation, as performing the grouping calculations continuously may impose a heavy computational burden, while taking too long between recalculations can result in inaccuracies as agents drift apart from one another.

Experiences that are used for the reinforcement learning of a particular agent 104 can be expressed as a sequence of historical data that is derived from the respective agent's own actions as well as experiences derived from similar agents' actions. Each experience may, for example, be represented as a tuple <S1, a, R, S2>, where S1 represents the input state of the object 102, 'a' represents the action taken by the agent 104, R represents the "reward" determined by whether the action produced a positive or negative outcome, and S2 represents the new state of the object 102 caused by the action 'a.' The experiences from other agents are applied in reinforcement learning in the same manner as the agent's own experiences, but weighted according to the similarity of the source agent.

Figure 2:
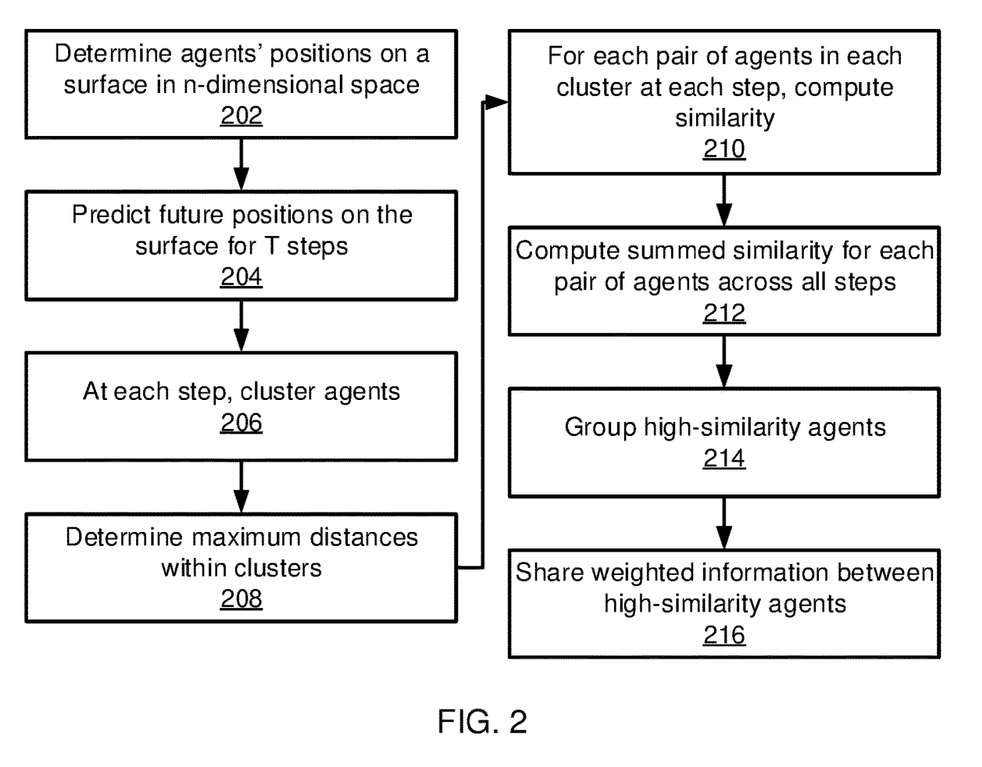
FIG. 2 is a block/flow diagram of a method for dynamically grouping similar agents and sharing information between grouped agents in accordance with an embodiment of the present invention.

Referring now to FIG. 2, a method of dynamic agent grouping is shown. Block 202 represents each agent's state (in other words, the values of its neural network parameters) as a point on a surface in an n-dimensional parameter space. The surface in the space represents values of a cost function across the n parameters, with each point on the surface representing a value that the agents could have for the cost function.

Block 204 predicts future positions for each agent 104 on the surface. Each step is denoted herein as k, with a total number of T steps being considered. The value T represents a maximum number of iterations of training the agent's neural network. Block 206 then clusters the agents 104 at each step k according to their positions on the surface at k and distances between them according to any appropriate distance metric. The agents 104 are divided into H clusters. Any appropriate clustering process may be used including, for example, k-means clustering. Block 208 computes a maximum distance within each cluster at each step (e.g., by determining a distance between the two agents in the cluster that are farthest apart), denoted as $D_{k,H}$.

For each pair of agents 104 in each cluster at each step, block 210 computes a similarity value $f(k,D_{k,H})$. This function can be any appropriate function that describes the similarity between two points on the surface, for example by taking the inverse of $D_{k,H}$, weighted by the step value, with higher values of k provide higher weights. Notably, for any step in which the two agents are not in the same cluster, the value off will be zero. Block 212 then sums the similarity between each pair of agents i and j across every step as $S_{i,j}=\Sigma_k f(k,D_{k,H})$. It is possible for agents to enter or leave clusters from one step to the next, so the final similarity score can be a sum of zero-valued and non-zero-valued similarities.

At block 214, the agent manager 108 groups agents with high similarities. For example, the agent manager 108 may normalize the similarity scores to a value between 0 and 1 and then may group any pair of agents 104 that has a normalized similarity score above a threshold. Grouping may be implemented as an inverted index, where each agent 104 is associated with any number of grouped agents. Thus, for example, for an agent i entry in the inverted index, the entry may include agents that have an above-threshold value for the normalized similarity. The entry thus indicates which agents grouped with agent i, along with their normalized similarity scores.

Block 216 shares weighted information between agents 104 that have been grouped together. Thus, for example, if agent 1 is similar to agents 2 and 5, then agent 1 will not only use its own experiences for reinforcement learning and refinement of its model, but it will also use experiences shared by agents 2 and 5. However, the shared experiences will be weighted in accordance with the normalized similarity score, with experiences from more similar agents having a greater impact on the reinforcement learning process than experiences from less similar agents. The agent's own experiences will be weighted with a value of 1.

Figure 3:
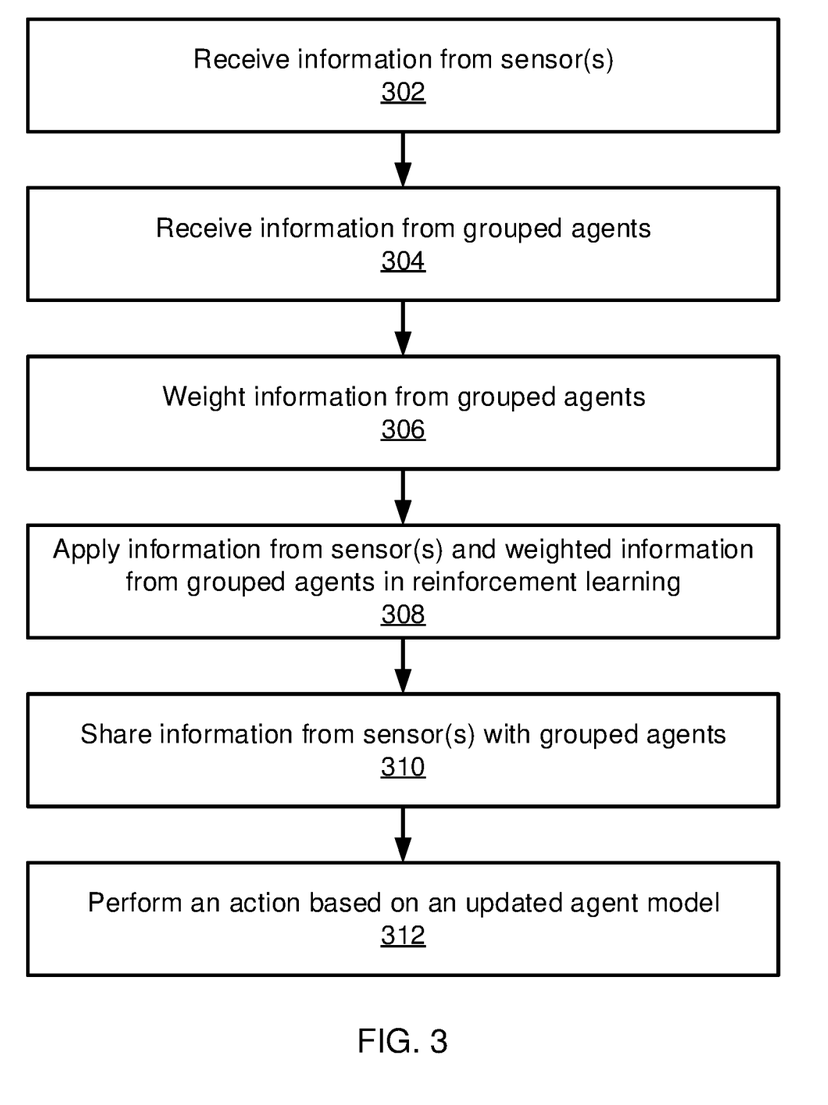
FIG. 3 is a block/flow diagram of a method for performing reinforcement learning with contributions from grouped agents in accordance with an embodiment of the present invention.

Referring now to FIG. 3, a reinforcement learning process performed at each agent 104 is shown. Block 302 receives information from one or more sensors at the agent 104. This information can represent any appropriate sensor information that is used by the agent 104 in decision-making. For example, the information can include location, speed, direction, temperature, light level, ambient sounds, still images, and/or video. The sensor(s) may provide information with any appropriate timing, including periodic polling or event-prompted data collection. Block 304 the receives information from one or more other, similar agents 104, along with a normalized similarity value for each respective agent. Block 306 weights the information from the similar agents according to the normalized similarity value, such that more-similar agents will provide a greater contribution to reinforcement learning.

Block 308 then applies the information from the one or more sensors and the weighted information from the similar agents in a reinforcement learning process. Because reinforcement learning is an ongoing, iterative process and uses new information as it becomes available, blocks 302-308 can be applied in any order, with block 308 updating the reinforcement learning model each time more information is received. At any appropriate time, block 310 shares the information received from the one or more sensors with the similar agents. As noted above, sharing information with the other agents can be performed through direct communications to the other agents or may, alternatively, be performed by sending the information to the agent manager 108 to be forwarded to the appropriate agent(s). Block 312 performs an action based on the reinforcement learning model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
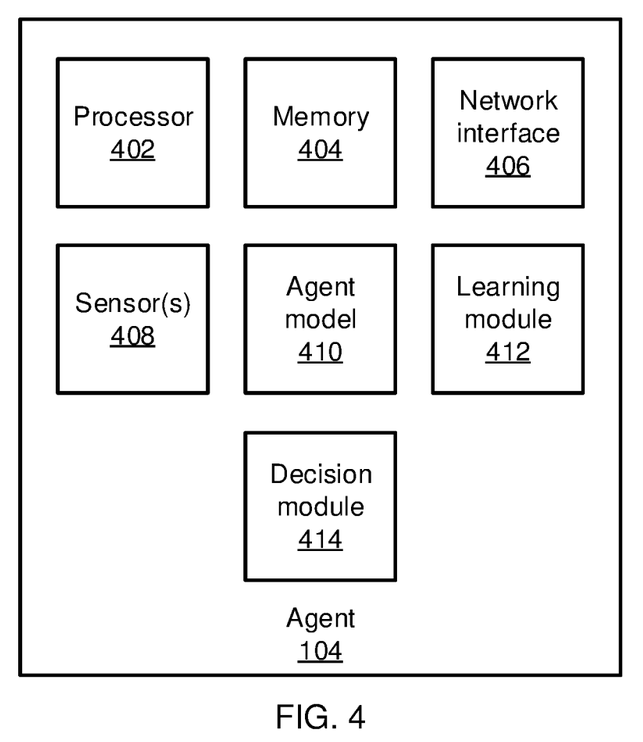
FIG. 4 is a block diagram of an agent that performs reinforcement learning based on shared information from similar agents in accordance with an embodiment of the present invention.

Referring now to FIG. 4, a diagram of an individual agent 104 is shown. The agent 104 includes a hardware processor 402 and memory 404. A network interface 406 provides communications between the agent 104 and the agent manager 108 and/or other agents 104. The network interface 406 may operate by any appropriate wired or wireless network medium and protocol. One or more sensors 408 operate to collect information about an object 102 and/or its environment. It should be understood that the agent 104 may be integrated with the object 102 or may, alternatively, be a separate system that interacts with the object 102. Thus the sensors 408 can be collocated with the agent 104 or may, in some embodiments, be located at a detached object 102 and may communicate sensor information to the agent 104 by the network interface 406. An agent 104 may, furthermore, interact with multiple objects 102.

The agent 104 further includes one or more functional modules that may, in some embodiments, be implemented as software that is stored in memory 404 and is executed by hardware processor 402. In other embodiments, the functional module(s) may be implemented as one or more discrete hardware components in the form of, e.g., application-specific integrated chips or field programmable gate arrays.

An agent model 410 accepts information from the sensor(s) 408 and provides an output regarding the object 102. This output may, for example, control the operation of the object 102 or may, alternatively, provide information to the user of the object—for example in the form of traffic instructions. As information arrives from the sensor(s) 408 or from other, similar agents via the network interface 406, a reinforcement learning module 412 updates the agent model 410 accordingly, with shared information being weighted according to the normalized similarity score before contributing to the model. Block 414 then uses outputs from the agent model 410 by, for example, controlling the behavior of the object 102 or by providing information to the user of the object through a user interface.

Figure 5:
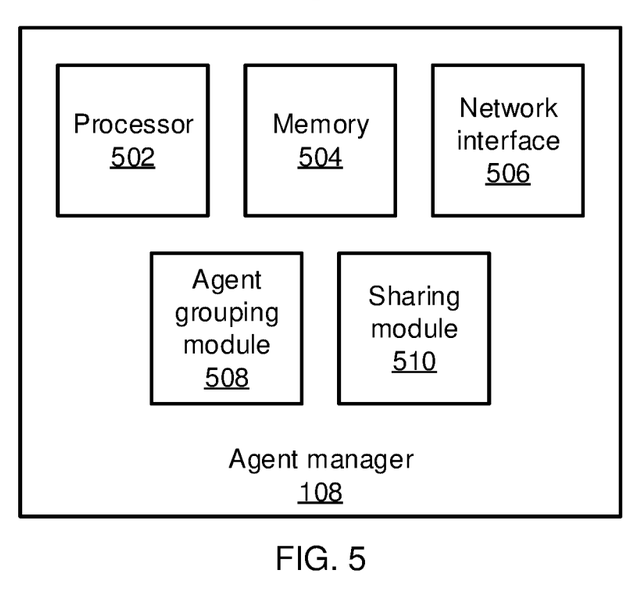
FIG. 5 is a block diagram of an agent manager that performs dynamic agent grouping and shares information between similar agents in accordance with an embodiment of the present invention.

Referring now to FIG. 5, a diagram of the agent manager 108 is shown. Although the agent manager 108 is described herein as being a single unit, it should be understood that the agent manager 108 can also be implemented in a distributed fashion using a cloud computing platform. The agent manager 108 includes a hardware processor 502, memory 504, and a network interface 506 that provides communication with the agents 104 via a wired or wireless communications medium and any appropriate communications protocol. As with the agent 104, the agent manager includes functional modules that may be implemented as software that is stored in memory 504 and that is executed by hardware processor 502. In other embodiments, the functional modules may be implemented as one or more discrete hardware components in the form of, e.g., application specific integrated chips or field programmable gate arrays.

An agent grouping module 508 receives the states of the agents 104 from the network interface 506, for example by receiving a copy of the neural network parameters that make up the respective agent models 410. The agent grouping module 508 identifies a normalized similarity score for each pair of agents and groups those agents that have a normalized similarity score above a threshold. A sharing module 510 receives sensor information from the agents 104 and, based on the grouping information determined by the agent grouping module 508, forwards that sensor information to those agents that are sufficiently similar to a source agent, along with the pair's normalized similarity score.

Figure 6:
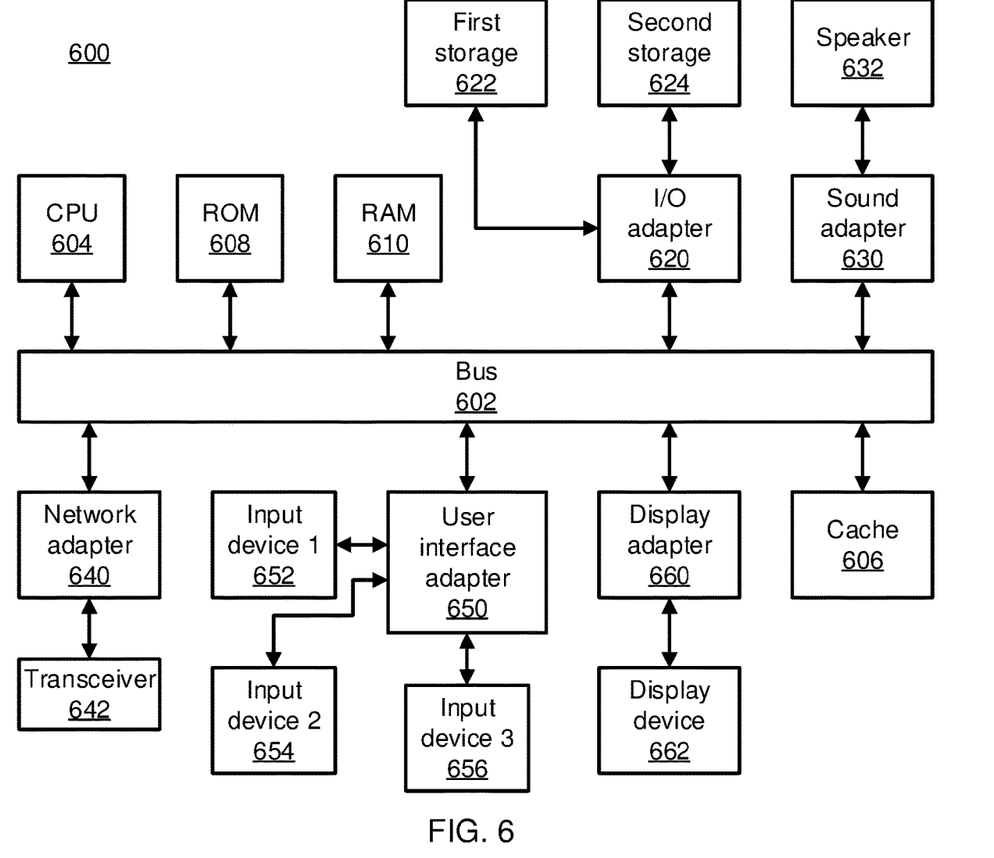
FIG. 6 is a block diagram of a processing system suitable for implementing the agent or agent manager in accordance with an embodiment of the present invention.

Referring now to FIG. 6, an exemplary processing system 600 is shown which may represent more detailed structure for the agents 104 and the agent manager 108. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Figure 7:
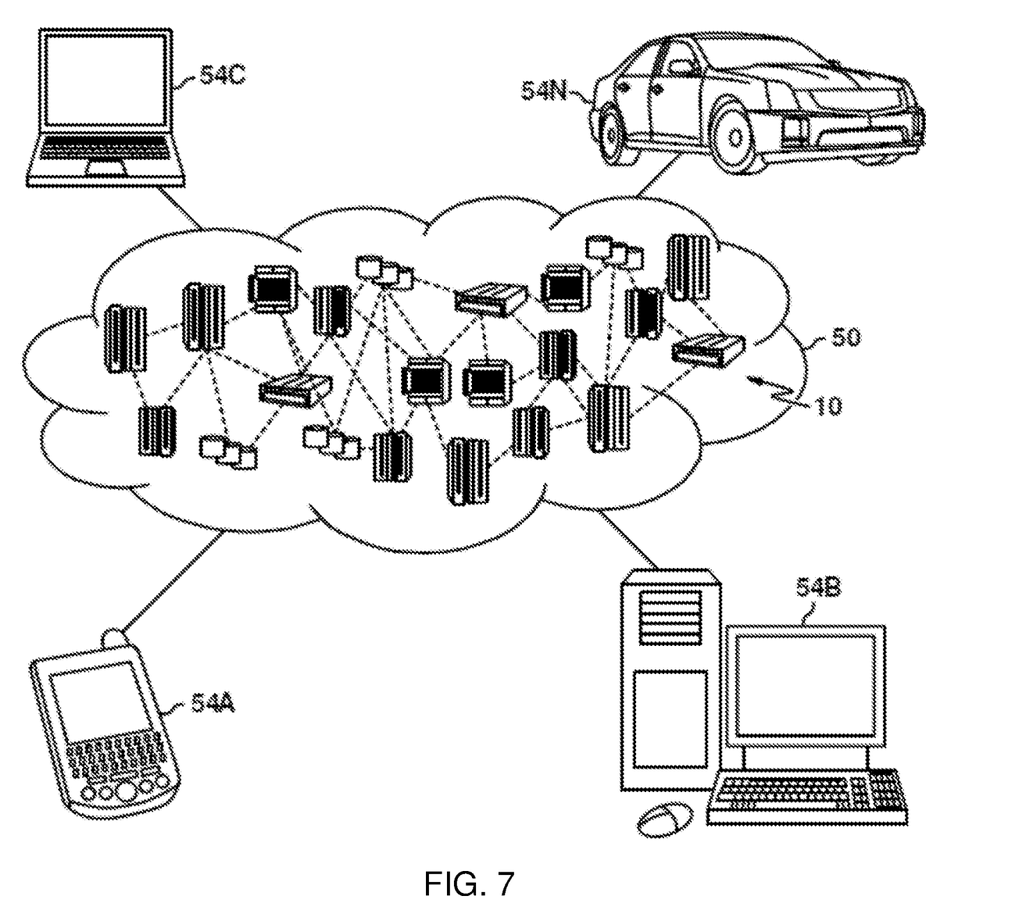
FIG. 7 is a diagram of a cloud computing environment according to the present principles.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
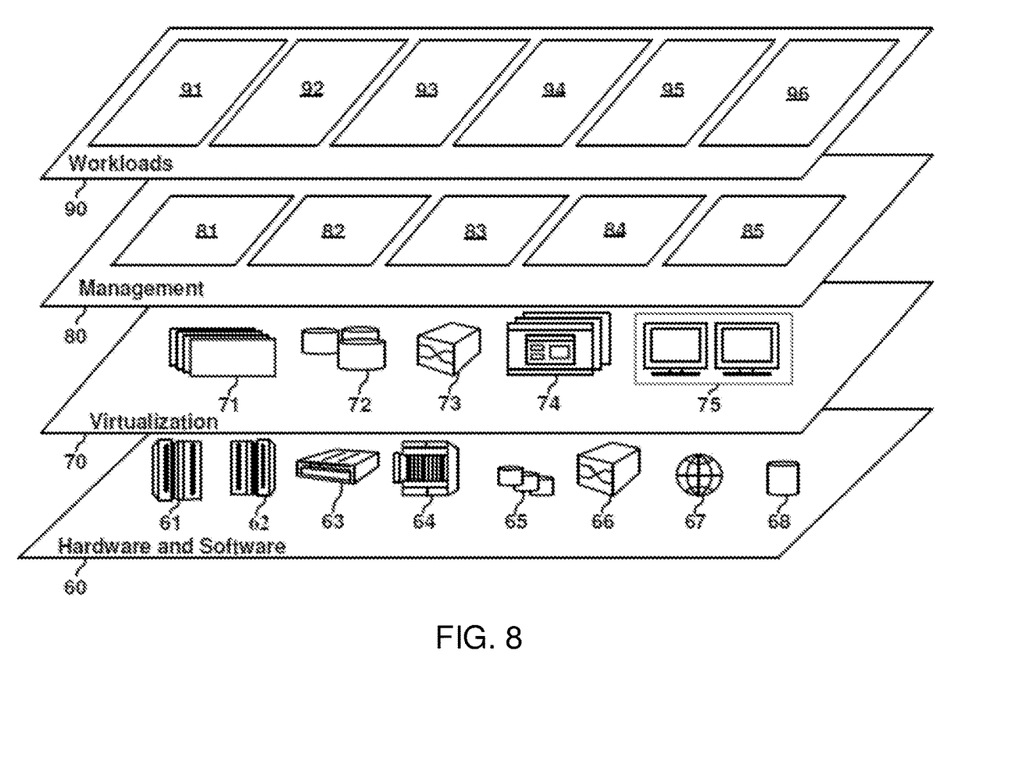
FIG. 8 is a diagram of abstraction model layers according to the present principles.

Referring now to FIG. 8, a set of functional abstraction layers provided by cloud computing environment 50 (FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic agent grouping 96.

Having described preferred embodiments of reinforcement learning by sharing individual data within dynamic groups (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for reinforcement learning with shared information, comprising:
gathering information at a first autonomous agent using one or more sensors;
receiving shared information at the first autonomous agent from a second autonomous agent;
training an agent neural network model at the first autonomous agent using the gathered information and the shared information, wherein the agent neural network model weighs a contribution of the shared information according to a degree of similarity between the first autonomous agent and the second autonomous agent to update parameters of the agent neural network model; and
generating an action using the trained agent neural network model responsive to the gathered information to manage air quality within a vehicle.

2. The computer-implemented method of claim 1, wherein training the agent neural network model comprises applying reinforcement learning to the agent neural network model.

3. The computer-implemented method of claim 2, wherein reinforcement learning uses the gathered information and the shared information as a sequence of historical experiences that are each expressed as an initial state, an action, a reward, and an output state.

4. The computer-implemented method of claim 1, wherein the degree of similarity is a normalized similarity score based on a measurement of distance in a parameter space that contains the first autonomous agent.

5. The computer-implemented method of claim 4, wherein the normalized similarity score is measured as a sum of weighted similarities across multiple iterations of training the agent model.

6. The computer-implemented method of claim 5, wherein similarities measured at later iterations are weighted more heavily in the normalized similarity score than similarities measured at earlier iterations.

7. The computer-implemented method of claim 5, wherein the sum of weighted similarities includes only contributions from iterations where the first autonomous agent and second autonomous agent are clustered together.

8. A computer-implemented method for dynamically grouping agents, comprising:
clustering a plurality of agent neural network models in a parameter space that represents parameters of the agent neural network models as points in the parameter space;
determining a similarity score for each pair of agent neural network models in the plurality of agent neural network models;
iterating said clustering and determining steps for a pre-determined number of iterations, determining a respective similarity score for each pair of agent neural network models in the plurality of agent neural network models at each iteration;
summing the similarity score for each pair of agent neural network models across all iterations;
grouping agent neural network models that have a summed similarity score that is above a threshold; and
sharing information from each agent with those other agent neural network models it has been grouped with, along with a respective summed similarity score, to train each agent neural network model to manage air quality within a vehicle.

9. The computer-implemented method of claim 8, further comprising normalizing each summed similarity score, wherein the respective summed similarity score that is sent to the other agent neural network models is the normalized summed similarity score.

10. The computer-implemented method of claim 9, wherein determining the similarity score comprises summing weighted similarities across multiple iterations of training an agent neural network model.

11. The computer-implemented method of claim 10, wherein similarities measured at later iterations are weighted more heavily in the similarity score than similarities measured at earlier iterations.

12. The computer-implemented method of claim 11, wherein the sum of the similarity score for each pair of agent neural network models across all iterations includes only contributions from iterations where a respective pair of agent neural network models is clustered together.

13. A system for providing personalized recommendations with dynamic agent grouping, comprising:
an agent manager configured to collect information from a plurality of agent neural network models and to share information between similar agent neural network models, comprising:
a processor device;
a network interface;
an agent grouping module configured to cluster the plurality of agent neural network models using the processor in a parameter space that represents parameters of agent neural network models as points in the parameter space, to determine a similarity score for each pair of agent neural network models in the plurality of agent neural network models, to iterate said clustering and determining for a predetermined number of iterations, to determine a respective similarity score for each pair of agent neural network models in the plurality of agent neural network models at each iteration, to sum the similarity score for each pair of agent neural network models across all iterations, and to group agent neural network models that have a summed similarity score that is above a threshold; and a sharing module configured to share information, using the network interface, from each agent neural network models with those other agent neural network models that each agent neural network models has been grouped with, along with a respective summed similarity score, to train each agent neural network models to manage air quality within a vehicle.

14. The system of claim 13, further comprising normalizing each summed similarity score, wherein the respective summed similarity score that is sent to the other agent neural network models is the normalized summed similarity score.

15. The system of claim 13, wherein determining the similarity score comprises summing weighted similarities across multiple iterations of training an agent model for each agent neural network models.

16. The system of claim 15, wherein similarities measured at later iterations are weighted more heavily in the similarity score than similarities measured at earlier iterations.

17. The system of claim 16, wherein the sum of weighted similarities includes only contributions from iterations where a respective pair of agent neural network models is clustered together.

18. The system of claim 13, further comprising a plurality of agent neural network models, each agent neural network models comprising:
- a processor device;
- a network interface configured to receive shared information and the respective summed similarity score of a second agent from the agent manager;
- one or more sensors configured to gather sensor information regarding a state of an object associated with the agent neural network models;
- a learning module configured to train an agent neural network model using the gathered sensor information and the shared information, wherein a contribution of the shared information is weighted according to the summed similarity score; and
- a decision module configured to generate an action using the trained agent neural network model responsive to the gathered sensor information.

19. The system of claim 18, wherein the learning module is further configured to apply reinforcement learning to the agent neural network model using a neural network.

20. The system of claim 18, wherein the learning module is further configured to use the gathered sensor information and the shared information as a sequence of historical experiences that are each expressed as an initial state, an action, a reward, and an output state.

* * * * *